United States Patent
Millikan et al.

(10) Patent No.: US 6,847,593 B2
(45) Date of Patent: Jan. 25, 2005

(54) METHOD FOR CONSTRUCTING COMPRESSED AUDIO FILE SYSTEM IN A COMPACT DISC PLAYER

(75) Inventors: Thomas N. Millikan, Houston, TX (US); Sreenivas Kothandaraman, Chennai (IN)

(73) Assignee: Texas Instruments Incorporated, Dallas, TX (US)

( * ) Notice: Subject to any disclaimer, the term of this patent is extended or adjusted under 35 U.S.C. 154(b) by 265 days.

(21) Appl. No.: 10/185,929

(22) Filed: Jun. 28, 2002

(65) Prior Publication Data

US 2003/0002399 A1 Jan. 2, 2003

Related U.S. Application Data

(60) Provisional application No. 60/302,151, filed on Jun. 29, 2001.

(51) Int. Cl.[7] .............................................. G11B 21/08
(52) U.S. Cl. ................................. 369/30.23; 369/47.34
(58) Field of Search .......................... 369/30.23, 47.34, 369/47.33, 47.32, 275.3; 711/3, 4, 102, 103, 104, 105, 111

(56) References Cited

U.S. PATENT DOCUMENTS

| | | |
|---|---|---|
| 5,502,700 A | 3/1996 | Shinada ........................ 369/50 |
| 5,615,187 A | 3/1997 | Shinada ........................ 369/48 |
| 5,640,383 A | 6/1997 | Kamoto et al. ........... 369/275.3 |
| 5,712,836 A | 1/1998 | Kamoto et al. ................ 369/50 |
| 5,754,427 A | 5/1998 | Akagiri .................. 364/400.01 |
| 5,822,288 A | 10/1998 | Shinada ........................ 369/54 |
| 5,872,933 A | 2/1999 | Kanai et al. ............ 395/200.61 |
| 5,943,307 A | 8/1999 | Takagi et al. .................. 369/54 |
| 6,061,306 A | 5/2000 | Buchheim ....................... 369/2 |
| 6,332,175 B1 * | 12/2001 | Birrell et al. ............. 369/30.23 |
| 6,353,173 B1 * | 3/2002 | D'Amato et al. ......... 369/275.3 |
| 6,693,869 B1 * | 2/2004 | Ballantyne .................... 369/84 |

* cited by examiner

*Primary Examiner*—Tan Dinh
(74) *Attorney, Agent, or Firm*—Robert D. Marshall, Jr.; W. James Brady, III; Frederick J. Telecky, Jr.

(57) ABSTRACT

A method and apparatus for constructing a file tree in a compact disc player from the file system of a compressed audio CD is disclosed. After determining the target sector for building the file tree of the CD player, the CD player reads into the memory of the CD player the target sector and a number of contiguous sectors following the target sector. After identifying a target sector, the CD player first determines if the target sector is cached in the memory of the CD player. If the target sector is cached in the memory of the CD player, the sector is retrieved from the CD player. If the target sector is not cached in the memory of the CD player, the target sector is retrieved from the file system of the CD, together with a number of sequential contiguous sectors following the target sector.

23 Claims, 1 Drawing Sheet

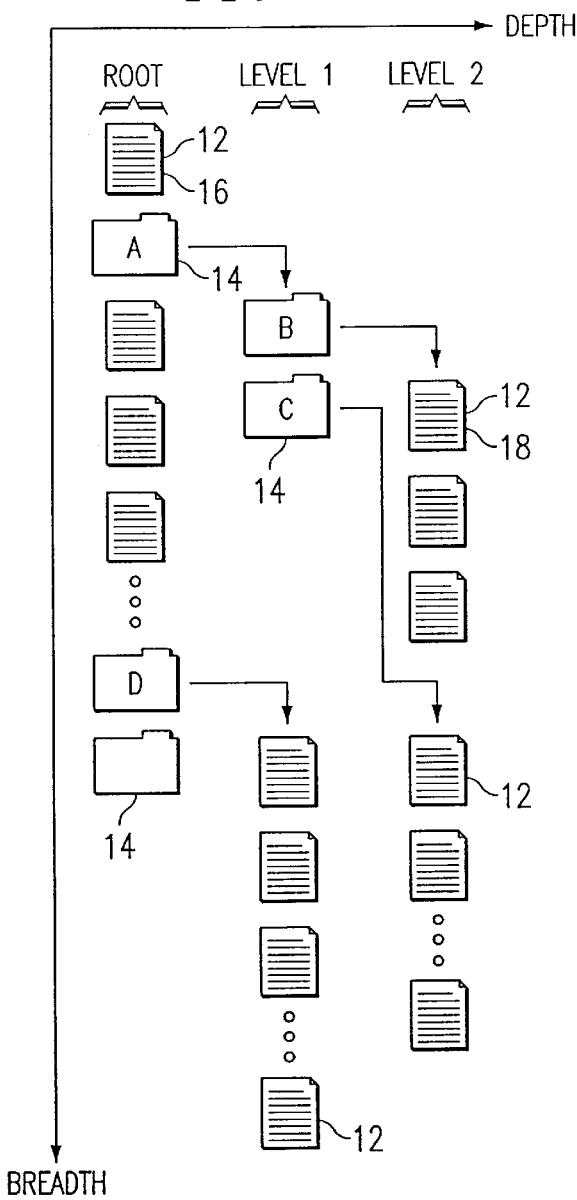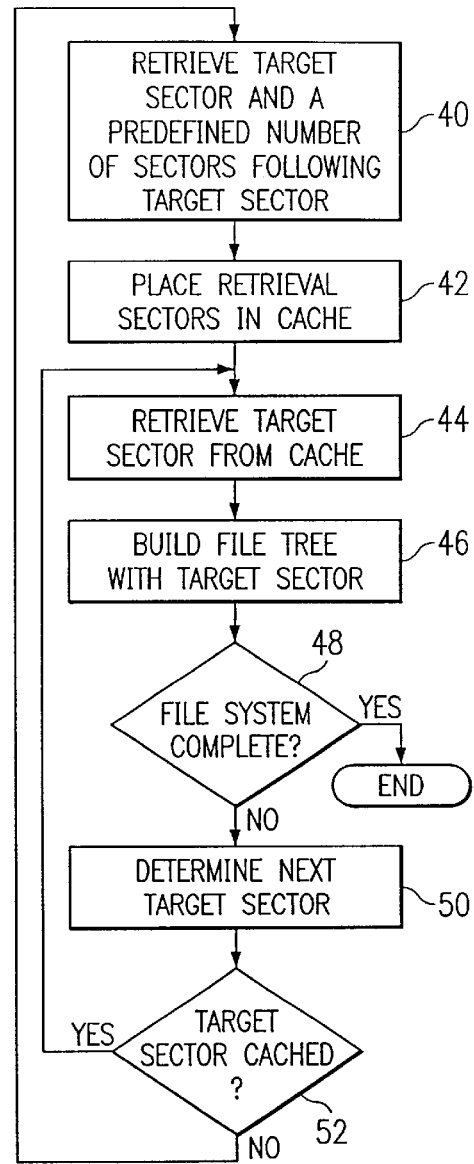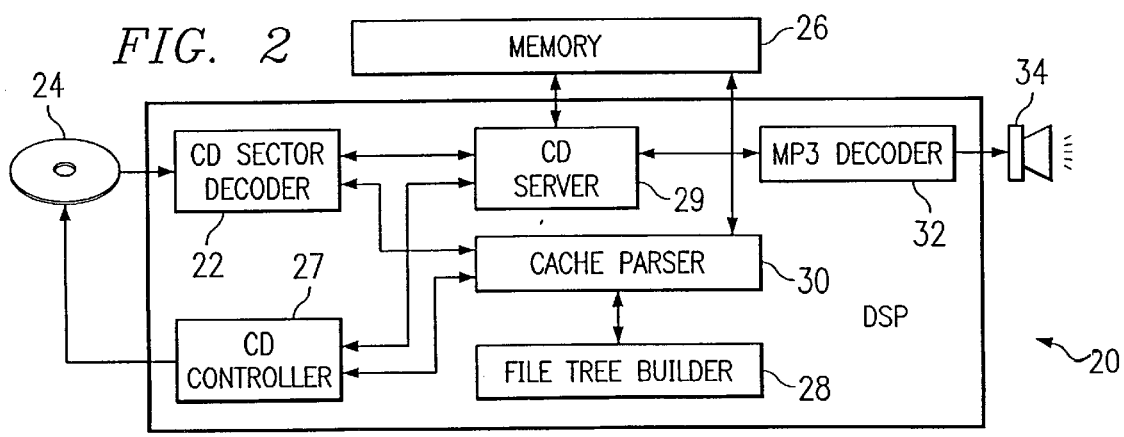

METHOD FOR CONSTRUCTING COMPRESSED AUDIO FILE SYSTEM IN A COMPACT DISC PLAYER

This application claims priority under 35 USC §119(e)(1) of Provisional Application No. 60/302,151, filed Jun. 29, 2001.

BACKGROUND OF THE INVENTION

This invention relates in general to the field of compact disc players for playing compressed audio and more particularly to a method and apparatus for constructing a file system in a compact disc player.

BACKGROUND OF THE INVENTION

A compact disc may be formatted to include compressed audio content, such as MP3 files or any other suitable compressed audio format. In the case of the MP3 compressed audio format, as many as 400 music files or songs can be placed on a single compressed audio CD. A CD that includes compressed audio files can be played on a CD player that is configured for the playback of compressed audio files formatted on a CD disc. CD players of this sort include CD-ROM players and hybrid CD players that can play both traditional CDs and CD-ROMs that include compressed audio files. Regardless of the particular compact disc format, CDs that includes compressed audio files are referred to herein as compressed audio CDs.

A CD that includes compressed audio files typically includes a file system. Conventional audio CDs do not include a file system. Instead, conventional audio CDs include directory information that is arranged sequentially on the CD. In contrast, the file system of a CD that includes compressed audio files is somewhat detailed and is arranged logically in the form of a tree data structure. The tree data structure of a compressed audio CD includes a root directory. A number of files or file folders can be placed on the root directory, with each file folder comprising a directory for a number of other files and file folders. The folders of the directory tree of the CD can be used to group individual files or songs on the basis of the artist of the selection, the album of the song or musical selection, or the type of song or music selection. This file system may be arranged according to the preferences of the user and may be unique to each CD to be played by the CD player.

When a CD having compressed audio data is inserted into a CD player that is configured to play the compressed audio content, the CD player typically reads the file system data of the CD and saves information from the file system of the CD to the memory of the CD player to create a file system in the memory of the CD player. The file system of the CD player is used by the CD player to locate MP3 files or other compressed audio files on the CD and to identify the logical and nested relationships between these files and the folders that contain these files on the CD. Building a file tree, which is the data structure of the file system saved to the memory of the CD player, is advantageous because it provides a quick guide for accessing the contents of the CD and obviates the need to access the file system information that is saved on the CD.

Building the file tree in the memory of the CD player from the file system data on a compressed audio CD is often a time-consuming process. The file system data on the CD disc is not arranged as sequential data. Rather, the file system data is encoded onto the disc in the form of a logical tree. Because of the format of the file system data on the CD, the CD player must make a number of seeks or jumps to locations on the CD to read in the required file system data. Seeks, however, are time-consuming. In part because of the delay introduced by the number of seeks required to build the file system of the CD, as many as ten seconds or more may elapse between the time that a user inserts a CD in the player and the playback of the first selection on the CD. This delay is unacceptable, as users of standard CD players are typically accustomed to playing a CD within one to two seconds of placing the CD in a standard CD player.

SUMMARY OF THE INVENTION

Accordingly, a need has arisen for a method and apparatus for quickly constructing the file tree of a CD player that is configured to play compressed audio in a manner that does not cause an unreasonable delay in the period between the insertion of a compressed audio CD in a CD player and the playback of music from the CD. In accordance with the teachings of the present invention, a method and apparatus for building the file tree on a CD player is provided that substantially eliminates or reduces the disadvantages and problems associated with prior techniques.

According to one embodiment of the present invention, a method and apparatus for file caching in a CD player is provided in which a caching technique greatly speeds the construction of the file tree for a compressed audio CD. When the CD player determines that a sector or frame of the CD should be retrieved for building the file tree for the CD, the CD player first determines if the sector or frame is cached in the memory of the CD player. If the sector is not cached in the memory of the CD player, the sector and a predetermined number of contiguous sectors following the target sector is retrieved from the CD. This group of sectors is stored in the memory of the CD player. Because portions of the directory data of the CD are now stored in the local memory of the CD player, it is more likely that additional target sectors necessary for the build of the file tree will be located in the cache.

An important technical advantage of the present invention is a reduction in the number of CD accesses necessary for building the file tree in a CD player. Instead of performing a seek for each sector necessary for building the file tree of the compressed audio CD, the technique of the present invention involves the retrieval of the target sector and a group of contiguous sectors immediately following the target sector. The contiguous sectors following the target sector may include sectors needed by the CD player for building the file tree of the CD. Caching the contiguous sectors immediately following the target sector permits the file system to be constructed more quickly because many of the sectors needed for the build are stored locally, eliminating the necessity for a time-consuming accesses to the CD.

Another important technical advantage of the present system is that the reduction of the latency between the insertion of a compressed audio CD and the playback of the CD is achieved even if there is a mismatch between the encoding structure of the file system of the CD and the search algorithm of the CD player. Thus, even if the CD was encoded according to a depth first scheme and the CD is configured to search the directory according to a breadth first scheme, the caching scheme of the present invention will nevertheless result in reduced latency between disc insertion and playback.

BRIEF DESCRIPTION OF THE DRAWINGS

A more complete understanding of the present invention may be acquired by referring to the accompanying figures in which like reference numbers indicate like features and wherein:

FIG. 1 is a graphical depiction of the logical structure of the file system of a compressed audio CD;

FIG. 2 is a functional block diagram of a digital signal processor and memory of a CD player that is configured to play compressed audio files; and FIG. 3 is a flow diagram for building a file tree in a CD player with the caching technique of the present invention.

DETAILED DESCRIPTION OF THE INVENTION

Shown in FIG. 1 is a graphical depiction of the logical structure of the file system of a compressed audio CD. The files of the file system are generally indicated by icons 12 and the folders of the file system are generally indicated by icons 14. A number of files 12 and folders 14 are at the root level of the file system. Files 12 may be compressed audio files, such as MP3 files. The contents of folder A are folder B and folder C, which are shown at Level 1 of the file system. Folder B, in turn, includes three music files 12, and Folder C also includes a number of music files 12. Folder A may represent an artist, for example, and Folders B and C may represent albums of the artist, with the individual selections from the albums of the artist included as files in Level 2. The other files of the root level and level 1 may be MP3 files for other artists. An entry for a file in the directory of a CD includes identifying information concerning the name of the file, the location of the file content on the CD, and the length of the file content on the CD. An entry for a folder in the directory of the CD includes identifying information concerning the name of the folder and a pointer to a second location on the CD that includes an identification of the contents of the folder.

The file system of a compressed audio CD can be described as having both depth and breadth. The depth of the file system is characterized by the existence or the number of nested file folders within any of the file folders of the file system. The breadth of a file system is characterized by the number of file and file folders existing at the root directory level or within any other file folder of the file system. A CD player that is configured to play compressed audio CDs uses the file system data on the CD to build a file tree that is stored in the CD player. The file tree is built by reading each file or folder in the file system according to a depth first or a breadth first searching scheme.

When using a depth first scheme, the CD player identifies files and file folders in the file system of the compressed audio CD by beginning in the root directory and identifying files sequentially. In a depth first scheme, the CD player will branch at each folder in a level to move to the contents of the folder in the next directory level. As an example, the CD player will read MP3 file 16 and folder A before jumping to folder B in level 1. The player will then read the identification information for folder B, before branching to the MP3 file 18 of folder B in level 2. Because there are no folders within folder B, the player will read the entire content of folder B in level 2 before returning to level 2 and reading the identification information for folder C. At each decision point, the CD player will branch to the contents of a file folder in a deeper directory level over the choice of continuing to identify files sequentially along the current directory level. The CD player will continue this pattern, returning to a higher-level directory when necessary, until all files and folders of the directory have been identified.

In a breadth first scheme, the CD player will identify each file or folder within a level before proceeding to another level. As an example, in the file system of FIG. 1, the CD player will first identify each file and folder in the root directory before proceeding to the next deepest level, which is level 1. The CD player will then read the identification information for each file folder in level 1 before proceeding to level 2, and so on. When using breadth level searching, the CD player will not branch to the next deepest directory level until all files and folders within the higher directory level have been identified.

Shown in FIG. 2 is a functional block diagram of a digital signal processor (DSP) and memory of a CD player, which is indicated generally at 20 and that is configured to play compressed audio files. A CD sector decoder 22 retrieves sectors from CD 24. After retrieving a sector or sectors from CD 24, CD sector decoder 22 performs an error correction routine on the data and stores the data in memory 26, which may be dynamic RAM. The file tree builder 28 determines the searching scheme for the build of the file tree and also identifies the target sector for the build of the file tree. The term target sector refers to the sector on the CD 24 whose data is currently necessary for the build of the file tree. The file tree builder 28 identifies the target sector to the cache parser 30. Before sending a retrieve instruction to CD controller 27, cache parser 30 determines if the target sector is in memory 26. At the completion of the file tree building, the file tree is passed for storage to memory 26. As part of the playback of audio, data is retrieved from memory 26 by CD server 29, which passes the data to MP3 decoder 32. MP3 decoder 32 processes the compressed audio data before transmission of the uncompressed audio stream to speaker system 34.

Shown in FIG. 3 is a flow diagram for building the file system in a CD player with the caching technique of the present invention. At step 40 the CD sector decoder retrieves the target sector and a predefined number of following contiguous sectors from the compressed audio CD. The number of contiguous sectors to be retrieved following the target sector is specific to the implementation of the CD player. In on embodiment, thirty-one contiguous sectors may be retrieved following the target sector so that a total of 32 sectors is retrieved as part of a single access to the CD. Thus, if sector 1 was the target sector, contiguous sectors 1–32 would be retrieved. At step 42, the retrieved sectors are placed in the memory or cache of the CD player. At step 44, the target sector is retrieved from the memory of the CD player, and at step 46 the file tree of the CD player is constructed using the retrieved target sector. At step 48, it is determined whether the file tree is complete. If the file tree is complete, the file tree building process of FIG. 3 comes to an end.

If the file system is determined to be incomplete, the CD player identifies at step 50 the next target sector. As described above, the CD player builds the file tree on the basis of depth searching or breadth searching. Once the next target sector has been identified, the CD player determines at step 52 if the target sector is cached or stored in the memory of the CD player. If the target sector is stored in the memory of the CD player, the target sector is retrieved from the cache at step 44. If the target sector is not cached, the target sector, together with a predefined number of contiguous sectors following the target sector, is retrieved from the CD at step 40 and saved to the local memory of the CD player. As an example, if the target sector is sector 48 and if the cache includes only sectors 1–32, sectors 48–80 will retrieved from the CD and saved to the cache.

The caching technique of the present invention involves the caching theories of spatial locality and temporal locality. In terms of spatial locality, when constructing the file system of the CD player, many of the next following target sectors will be in the physical space on the compressed audio CD following the current target sector. The presence of target sectors in the locality of the current target sector is especially appropriate when the directory of the CD is encoded according to a depth first or breadth first scheme and the file tree of the CD player is constructed according to a matching depth first or breadth first searching scheme. As an example, when the directory of a CD is encoded in a breadth first scheme, the files and folders of each directory, including the root directory, will be encoded in contiguous sectors on the CD. Likewise, in terms of temporal locality, if the CD player is building its file system on the basis of a breadth first searching scheme, it will identify target sectors for building the file system in roughly the same contiguous order as those sectors are encoded on the CD. In this scenario, caching a predefined number of contiguous sectors following the target sector will have the effect of retrieving among the contiguous sectors many of the next following target sectors to be used for the construction of the file system.

The technique of the present invention also speeds the building of the file tree in those instances in which the compressed audio CD is encoded according to a depth or breadth encoding technique and the file tree is constructed according to the opposite depth or breadth searching technique. Even in this scenario, and depending on the size of the cache and the number of sectors retrieved following the target sector, target sectors will be located in the cache, thereby avoiding the necessity of performing a seek and retrieval function on the CD.

The present invention is advantageous in that the caching technique disclosed herein decreases the number of seeks required to build the file system of the CD player. Because the motor of the CD player and the CD itself are continuously rotating, a seek must be performed each time that the CD player resumes the reading in of data from the CD. Because a contiguous group of sectors is read in as part of each access to the CD, the number of seeks required to complete the build of the file system of the CD player is reduced.

Although this invention has been described with reference to the MP3 data format, it should be understood that the invention may be employed with any other compressed audio format. Although the present invention has been described in detail, it should be understood that various alterations, changes, modifications, and substitutions may be made to the teachings described herein without departing from the scope of the present invention, which is solely defined by the appended claims.

What is claimed is:

1. A method for constructing a file tree for a CD player that is configured to play compressed audio files from file system data on a compressed audio CD, comprising the steps of:
    retrieving a target sector and a predetermined number of following contiguous target sectors from the CD;
    storing the sectors in the memory of the CD player;
    determining the next target sector;
    determining if the next target sector is cached in the memory of the CD player;
    retrieving the next target sector from the memory of the CD player if the next target sector is in the memory of the CD player.

2. The method for constructing a file tree for a CD player that is configured to play compressed audio files from file system data on a compressed audio CD of claim 1, further comprising the step of retrieving the next target sector from the CD if it is determined that the next target sector is not stored in the memory of the CD player.

3. The method for constructing a file tree for a CD player that is configured to play compressed audio files from file system data on a compressed audio CD of claim 2, further comprising the step of retrieving a number of sectors in addition to the target sector as part of the step of retrieving the next target sector from the CD.

4. The method for constructing a file tree for a CD player that is configured to play compressed audio files from file system data on a compressed audio CD of claim 3, wherein the number of sectors that are retrieved in addition to the target sector are contiguous and sequential to the target sector.

5. The method for constructing a file tree for a CD player that is configured to play compressed audio files from file system data on a compressed audio CD of claim 4, further comprising the step of storing the retrieved sectors in the memory of the CD player.

6. The method for constructing a file tree for a CD player that is configured to play compressed audio files from file system data on a compressed audio CD of claim 5, wherein the number of contiguous sectors to be retrieved by the CD player from the CD is predefined.

7. The method for constructing a file tree for a CD player that is configured to play compressed audio files from file system data on a compressed audio CD of claim 6, wherein the size of the number of sectors to be retrieved by the CD player from the CD is comparable to the size of the memory of the CD player.

8. A method for constructing a file system for a CD player that is configured to play compressed audio files from file system data on a compressed audio CD, comprising the steps of:
    identifying an initial target sector in the directory of the CD;
    retrieving a grouping of sectors from the CD, the grouping of sectors including the initial target sector;
    storing the grouping of sectors in the memory of the CD player;
    identifying the next target sector for the construction of the file system of the CD player;
    retrieving the next target sector from the CD only if it is determined that the next target sector is not in the memory of the CD player.

9. The method for constructing a file system for a CD player that is configured to play compressed audio files from file system data on a compressed audio CD of claim 8, wherein the grouping of sectors retrieved from the CD includes a number of contiguous sequential sectors following the initial target sector.

10. The method for constructing a file system for a CD player that is configured to play compressed audio files from file system data on a compressed audio CD of claim 9, wherein the number of contiguous sectors retrieved as part of the grouping of sectors is predefined.

11. The method for constructing a file system for a CD player that is configured to play compressed audio files from file system data on a compressed audio CD of claim 10, wherein the memory size of the grouping of sectors is comparable to the size of the memory of the CD player.

12. The method for constructing a file system for a CD player that is configured to play compressed audio files from file system data on a compressed audio CD of claim 8,
    wherein the file system data of the CD is encoded according to an encoding algorithm; and wherein the step of identifying the next target sector is accomplished according to a like searching algorithm.

13. The method for constructing a file system for a CD player that is configured to play compressed audio files from file system data on a compressed audio CD of claim 12,
   wherein the file system data of the CD is encoded according to a depth first encoding algorithm; and
   wherein the step of identifying the next target sector is accomplished according to a depth first algorithm.

14. The method for constructing a file system for a CD player that is configured to play compressed audio files from file system data on a compressed audio CD of claim 12,
   wherein the file system data of the CD is encoded according to a breadth first encoding algorithm; and
   wherein the step of identifying the next target sector is accomplished according to a breadth first algorithm.

15. The method for constructing a file system for a CD player that is configured to play compressed audio files from file system data on a compressed audio CD of claim 8,
   wherein the file system data of the CD is encoded according to an encoding algorithm; and
   wherein the step of identifying the next target sector is accomplished according to a dissimilar searching algorithm.

16. The method for constructing a file system for a CD player that is configured to play compressed audio files from file system data on a compressed audio CD of claim 15,
   wherein the file system data of the CD is encoded according to a depth first encoding algorithm; and
   wherein the step of identifying the next target sector is accomplished according to a breadth first algorithm.

17. The method for constructing a file system for a CD player that is configured to play compressed audio files from file system data on a compressed audio CD of claim 15,
   wherein the file system data of the CD is encoded according to a breadth first encoding algorithm; and
   wherein the step of identifying the next target sector is accomplished according to a depth first algorithm.

18. The method for constructing a file system for a CD player that is configured to play compressed audio files from file system data on a compressed audio CD of claim 8, wherein the step of retrieving the next target sector from the CD includes the step of retrieving the next target sector as part of a grouping of sectors that includes the next target sector and a number of additional sectors.

19. The method for constructing a file system for a CD player that is configured to play compressed audio files from file system data on a compressed audio CD of claim 18, wherein the additional sectors are contiguous sequential sectors following the next target sector.

20. The method for constructing a file system for a CD player that is configured to play compressed audio files from file system data on a compressed audio CD of claim 19, further comprising the step of storing in the memory of the CD player the next target sector and the additional sectors.

21. A CD player for playing compressed audio files, comprising:
   a CD sector decoder for retrieving sectors from a CD;
   a memory coupled to the CD sector decoder for storing sectors retrieved from the CD;
   a cache parser coupled to the CD sector decoder and memory and able to determine if a sector is present in memory; and
   a file tree builder coupled to the cache parser and able to identity to the cache parser the next sector necessary for the construction of the file tree of the CD player;
   where in the cache parser instructs the CD sector decoder to retrieve a sector from the CD only if it is determined that the sector is not present in memory.

22. The CD player of claim 18, wherein the CD sector decoder retrieves from the CD the requested sector together with a contiguous group of sectors following the requested sector.

23. The CD player of claim 19, wherein the contiguous group of sectors following the requested sector is of a predetermined length.

* * * * *